(12) United States Patent
Berstis et al.

(10) Patent No.: US 6,282,653 B1
(45) Date of Patent: Aug. 28, 2001

(54) ROYALTY COLLECTION METHOD AND SYSTEM FOR USE OF COPYRIGHTED DIGITAL MATERIALS ON THE INTERNET

(75) Inventors: Viktors Berstis; Maria Azua Himmel, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/080,030

(22) Filed: May 15, 1998

(51) Int. Cl.[7] ....................................... G06F 11/30
(52) U.S. Cl. ............................. 713/200; 713/201
(58) Field of Search ..................... 713/200, 201, 713/202, 150–181

(56) References Cited

U.S. PATENT DOCUMENTS

| | | | |
|---|---|---|---|
| 5,390,297 | * | 2/1995 | Barber et al. ......................... 395/200 |
| 5,845,069 | * | 12/1998 | Tanaka ................................. 713/200 |
| 5,935,246 | * | 8/1999 | Benson ................................ 713/200 |
| 5,950,860 | * | 5/1999 | Olsen et al. ......................... 713/201 |
| 5,996,076 | * | 11/1999 | Rowney et al. ...................... 713/201 |
| 6,012,143 | * | 1/2000 | Tanaka ................................. 713/200 |
| 6,029,145 | * | 2/2000 | Barritz et al. ......................... 705/34 |
| 6,189,146 | * | 2/2001 | Misra et al. .......................... 717/11 |

* cited by examiner

*Primary Examiner*—Thomas Black
*Assistant Examiner*—Mary Wang
(74) *Attorney, Agent, or Firm*—Jeffrey S. LaBaw; Joseph R. Burwell; David H. Judson

(57) ABSTRACT

A method, system and computer program product to facilitate royalty collection with respect to online distribution of electronically published material over a computer network. In one embodiment, a method for managing use of a digital file (that includes content subject to copyright protection on behalf of some content provider) begins by establishing a count of a number of permitted copies of the digital file. In response to a given protocol, a copy of the digital file is then selectively transferred from a source to a target. Thus, for example, the source and target may be located on the same computer with the source being a disk storage device and the target being a rendering device (e.g., a printer, a display, a sound card or the like). The method logs an indication each time the digital file is transferred from the source to a target rendering device, and the count is decremented upon each transfer. When the count reaches a given value (e.g., zero), the file is destroyed or otherwise prevented from being transferred from the source device. The indications logged are transferred to a management server to facilitate payment of royalties to the content provider.

46 Claims, 5 Drawing Sheets

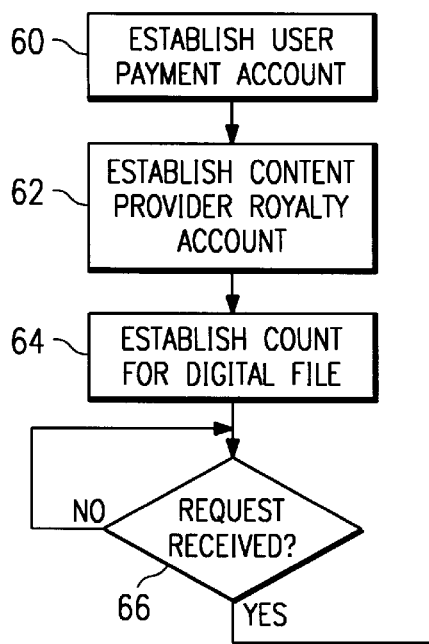
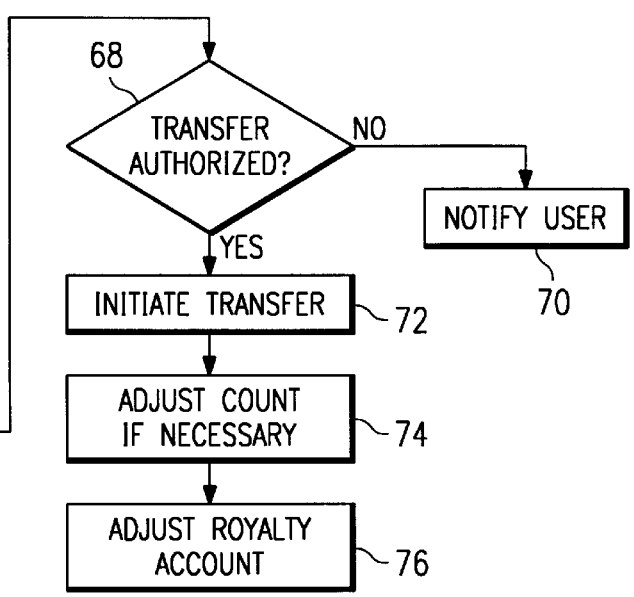
*FIG. 5*
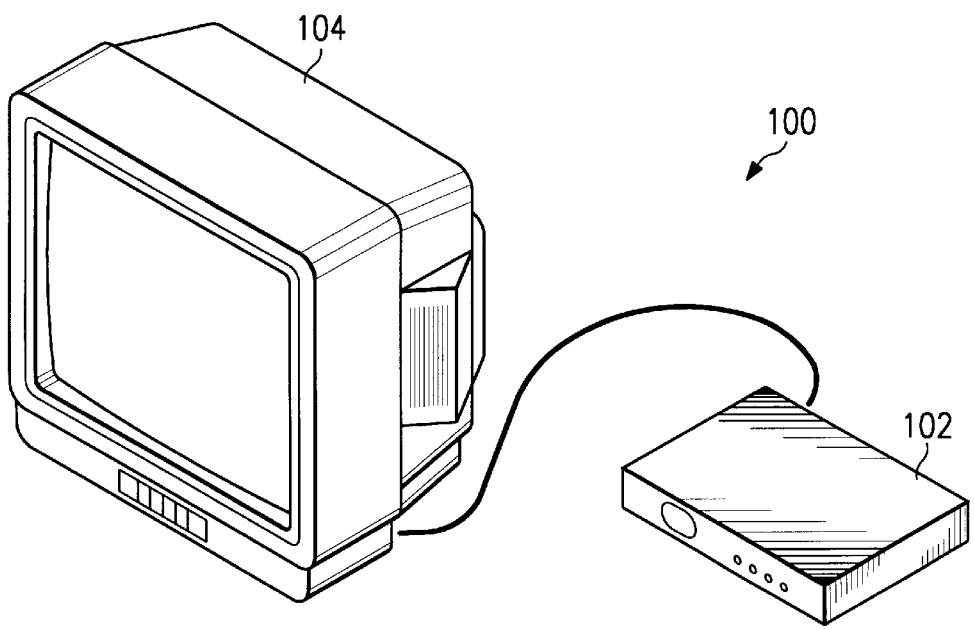
*FIG. 6A*
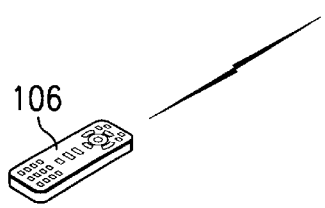

ROYALTY COLLECTION METHOD AND SYSTEM FOR USE OF COPYRIGHTED DIGITAL MATERIALS ON THE INTERNET

BACKGROUND OF THE INVENTION

1. Technical Field

The present invention relates generally to managing collection of royalties for electronically-published material distributed over a computer network.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

One of the technical advantages of the World Wide Web is the ease with which digital content (e.g., graphics, sound, video, movies and the like) may be transmitted and distributed to many users. Indeed, copying a digital file is as easy as clicking on a computer mouse. Copyright laws afford a copyright owner the exclusive right to reproduce the copyrighted work in copies, to distribute such copies, and to publicly perform and display the work. Each time a digital file is transferred over the Internet and copied onto a user's memory, the copyright owner's exclusive reproduction right is implicated (and possibly violated). Likewise, transmission of the copyrighted work over the physical wire is tantamount to a distribution. Indeed, in an open system (e.g., a personal computer accessing the World Wide Web through an Internet Service Provider (ISP)), copies of copyrighted materials can undergo unlimited further copying and transmission without the ability of the owner to collect appropriate compensation (e.g., royalties).

Many publishers or other content providers naturally are hesitant to make their copyrighted works available over the Internet due to the ease with which these materials may be copied and widely disseminated without adequate compensation. Presently, Internet commerce remains highly unregulated, and there is no central authority for managing collection and allocation of content provider royalties. Moreover, while publishers and content rights societies and organizations are attempting to address the legal and logistical issues, the art has yet to develop viable technical solutions.

One technique that has been proposed involves wrapping a copyrighted work in a copy protection "environment" to facilitate charging users for use of that information obtained from the Internet or World Wide Web. This approach, called COPINET, links a copyright protection mechanism with a copyright management system, and it is described in *Charging, paying and copyright—information access in open networks,* Bennett et al., 19th International Online Information Meeting Proceedings, Online Information 1995 pp. 13–23 (Learned Information Europe Ltd.). Publishers in such a system can determine an appropriate level of protection while monitoring use and managing the chain of rights. This approach is also said to provide protection for digital material even after delivery to the user workstation. In particular, copyright material is "wrapped" (by encryption) and "unwrapped" as a result of a specific authorization provided by a trusted subsystem. Material thus is only "visible" to the environment and thus any subsequent user actions, such as "save" or "copy", result in the protected material, or material derived from it, remaining in a protected state when outside the environment.

Although the above-described approach provides some advantages, it does not address the problem of managing the collection of royalties and/or the allocating of such payments to content providers. Moreover, it is not an accepting solution in the context of an open PC architecture such as implemented in the public Internet. It also requires the use of a separate trusted subsystem to generate the authorizations for particular content transfers, which is undesirable.

Other known techniques for managing use of content over the Internet typically involve electronic "wallets" or smart cards. Known prior art systems of this type are illustrated, for example, in U.S. Pat. Nos. 5,590,197 and 5,613,001. These systems involve complex hardware and encryption schemes, which are expensive and difficult to implement in practice. They are not readily adaptable to provide general royalty payment schemes for Internet content usage.

Thus, there remains a need to provide improved methods and systems for collecting royalties on the Internet as a result of use of copyrighted content.

The present invention solves this important problem.

SUMMARY OF THE INVENTION

An object of this invention is to enable a pair of certified devices (e.g., a storage device and a rendering device) to operate within the context of a given security protocol and thereby manage copies of a digital file and associated copy control information.

Still another object of this invention is to enable a copyright proprietor to maintain a degree of control over copyrighted content even after that content has been fetched from a server and downloaded to a client machine, e.g., in a Web client-server environment.

A particular object of the present invention is to manage the number of copies of a digital file that may be made within a Web appliance having a secure disk storage and that is connectable to the Internet using a dialup network connection.

A still further object of this invention is to restrict a number of copies of a digital file that may be made at a given Web client machine connected to the World Wide Web.

It is yet another object of this invention to enable a publisher of an electronic document to control the number of copies of such document that may be made on the Internet by permitted users.

It is a more general object of this invention to manage permissible use of copyrighted content on the Internet and World Wide Web.

It is still another more general object of this invention to manage collection of information to facilitate payment of appropriate compensation to content providers and publishers arising from use of their copyrighted content on the Internet.

Another object of this invention is to manage the charging of users for information obtained from the Internet or World Wide Web.

A still further object of this invention is to facilitate royalty collection as a result of electronically published material distributed online over a computer network (e.g., the public Internet, an intranet, an extranet or other network).

One embodiment of the invention is a method for managing copies of a digital file, which includes content subject to copyright protection, on behalf of some content provider (e.g., an author, publisher or other). It is assumed that a given usage scheme has been established with respect to the file as defined in copy control information associated with the file. Thus, for example, the copy control information may define a set of payment options including, without limitation, prepayment (for "n" copies), pay-per-copy (as each copy is made), IOU (for copies made offline), or some other payment option. The copy control information may also include other data defining how the file is managed by the scheme including: a count of the number of permitted copies, a count of the number of permitted pay-per-copy versions, copyright management information, payee information, an expiration date (after which copying is no longer permitted), and the like.

The present invention assumes the existence of a pair of devices, a "source" and a "target", that have been or are certified to use the scheme. Typically, the "source" is a storage device while the "target" is a rendering device. An illustrative storage device may be disk storage, system memory, or the like. An illustrative rendering device may be a printer, a display, a sound card or the like. The source and target devices may both be storage devices (e.g., a Web server and a client disk storage). In either case, each of the devices comprising the pair is "certified" (typically upon manufacture) to operate under a given security protocol. Under the protocol, the devices include appropriate circuitry and/or software, as the case may be, to facilitate the establishment of a secure link between the storage and rendering devices. Each device requires the other to validate itself and thus prove that the device can be trusted to manage the content (namely, the digital file) sought to be protected.

When the technique is implemented in an "open" client-server environment, hardware devices (e.g., microcontrollers) preferably are used in the storage and rendering devices to facilitate generation of the secure link. When the technique is implemented in a "closed" Web appliance environment, the secure link may be established and managed using software resident in the control routines associated with the storage and rendering devices. The secure link may be established and managed in software under such conditions because, in the Web appliance environment, it is possible to readily disable the secure link in the event of tampering with the appliance housing or other circuitry. Regardless of the environment, the secure link is first established between the "certified" storage and rendering devices. Thereafter, the digital file, together with at least part of its copy control information, is transferable between the storage and rendering devices in accordance with the particular usage and payment scheme being utilized. Thus, for example, if a prepayment scheme is implemented and an expiration date (associated therewith) has not occurred, a given number of copies of the file may be transferred between the storage and rendering devices. The prepayment funds are collected at a central location and then redistributed to the copyright proprietor or some third party.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which:

FIG. 5 is a flowchart of a preferred method of managing a digital file according to the present invention;

FIG. 6A is pictorial representation of a data processing system unit connected to a conventional television set to form a "Web" appliance;

DETAILED DESCRIPTION OF THE PREFERRED EMBODIMENT

Figure 1:
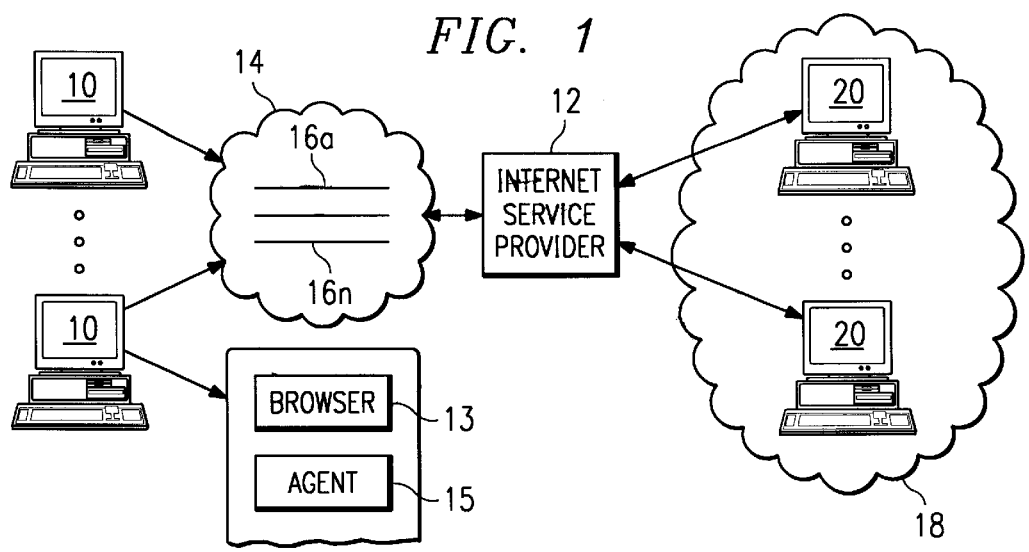
FIG. 1 is a representative system in which the present invention is implemented.

A representative system in which the present invention is implemented is illustrated in FIG. 1. A plurality of Internet client machines 10 are connectable to a computer network Internet Service Provider (ISP) 12 via a "resource" such as a dialup telephone network 14. As is well known, the dialup telephone network usually has a given, limited number of connections 16a–16n. ISP 12 interfaces the client machines 10 to the remainder of the network 18, which includes a plurality of Internet server machines 20. A client machine typically includes a suite of known Internet tools (e.g., Web browser 13) to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is done using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

As will be described in more detail below, the present invention may be implemented in hardware and/or in software. The software implementation is particularly useful when the client machine is an Internet or Web appliance, such as illustrated in FIGS. 6A–6D. In the case of the software implementation, a client machine has associated therewith a software routine 15 designed to perform one or more of the functions of the digital file copy protection method, as will be described. The software is preferably a client application (although it may be implemented with the browser as a plug-in, or with a client-side proxy, or as a standalone application). Alternatively, the agent is built into the browser, or it is implemented as a Java applet or standalone application. Thus, as used herein, in this particular embodiment, the software 15 is any application running on a client machine 10 that performs the copy protection/royalty management task(s) on behalf of the user(s) of that client according to the present invention.

The discussion which follows primarily uses the words "copying" or "copies" to describe the control of the further exercise of a copyright right for a particular work. The reader should understand that "copying" could include other types of rendering of the work for different devices. That is, "copying" in a printer would entail printing on paper or another substrate. Copying on a display is presenting an image on the screen. Copying in an audio device would be the performance of an audio portion of the work. Each of these devices both storage devices, e.g., hard disks, tapes in CDR, and rendering devices, e.g., prints, display graph, audio player, movie player, should be equipped with the present invention so that the copies are controlled throughout the systems and networks until their final rendering place.

The present invention is a method for managing copies of a digital file, which includes content subject to copyright protection, on behalf of some content provider (e.g., an author, publisher or other). It is assumed that a given payment scheme has been established with respect to the file. Thus, for example, such payment schemes include, without limitation, prepayment (for "n" copies), pay-per-copy (as each copy is made), IOU (for copies made offline), or some other payment option. In a prepayment option, a user prepays funds for the right to obtain copies of the digital file. In a pay-per-copy (or "pay as you go") option, the user pays for each copy of the digital file when the file is copied. In an IOU scheme, the user makes copies of the digital file (e.g., while the client machine is not connected to the network) and generates an IOU (or many IOUs) that are then submitted to a clearinghouse or other payment entity when the user later goes online. Other payment schemes (such as a combination of the above options) may also be implemented.

The payment scheme is preferably defined in copy control information associated with the file and established by the author, publisher or some other third party. Thus, for example, the copy control information may also include a count of the number of permitted copies, a count of the number of permitted pay-per-copy versions, a count of the number of copies that may be made under an IOU payment option, copyright management information identifying the author, publisher and/or other license or use restrictions, information about a bank or other financial institution that handles use payments and their reconciliation, one or more expiration dates (after which copying is no longer permitted), and the like.

The copy control information associated with a given file thus defines a usage scheme for the file because it includes information that controls how the content may be used, how such use is paid for, over what period the content may be used, and other such information. A particular usage scheme (or some portion thereof) may also be implemented in the devices between which the file is transferred, although preferably such restrictions are defined by the content provider.

Figure 2:
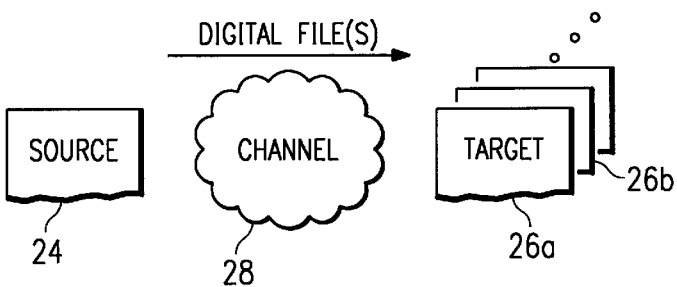
FIG. 2 is a simplified block diagram of a source device and a target device connected by a channel over which a digital file is transferred according to the present invention.

According to the present invention as illustrated in FIG. 2, the present invention assumes the existence of a pair of devices, a "source" 24 and a "target" 26, that have been or are certified to use the scheme. In particular, devices that implement the inventive scheme preferably include a device certificate that is not accessible (and thus is free from tampering) and stored therein. The certificate evidences that the device is capable of understanding a given security protocol useful in carrying out the protection scheme. A representative security protocol is CSS, or the Content Scrambling System protocol, available commercially from Matsushita Corp. Thus, for example, if the source device is a disk storage, the device certificate is typically stored inside a secure chip within the device control hardware. Typically, each of the devices is "certified" upon manufacture, although this is not a requirement.

As also illustrated in FIG. 2, a channel 28 is established between the source and target devices over which copies of a digital file (that is subject to the scheme) are communicated in a secure fashion. Thus, prior to transfer of the digital file, the channel 28 is first established between the devices to ensure that the copy restrictions (such as set forth in the copy control information) may be enforced. Typically, this is accomplished by having each device (in accordance with the security protocol implemented) require the other device (of the pair) to verify that its device certificate is valid. An appropriate message exchange may be used for this purpose as defined in the protocol. Once the secure link has been established, each of the devices can be trusted to control the digital file in accordance with the file's copy control information.

Typically, the "source" 24 is a storage device while the "target" 26 is a rendering device. An illustrative storage device may be disk storage, system memory, or the like. An illustrative rendering device may be a printer, a display, a sound card or the like. The source and target devices may both be storage devices (e.g., a Web server and a client disk storage).

When the technique is implemented in an "open" client-server environment, hardware devices (e.g., microcontrollers) are used in the storage and rendering devices to facilitate generation and management of the secure link. When less security may be tolerated, some of these functions may be implemented in software. When the technique is implemented in a "closed" Web appliance environment (FIGS. 6A–6D), the secure link may be established in whole or in part using software resident in the control routines associated with the storage and rendering devices. The secure link may be established in software under such conditions because, in the Web appliance environment, it is possible to readily disable the secure link in the event of tampering with the appliance housing or other circuitry. Regardless of the environment, the secure link is first established between the "certified" storage and rendering devices. Thereafter, the digital file, together with at least part of its copy control information, is transferable between the storage and rendering devices in accordance with the particular usage scheme defined, for example, by the copy control information. Thus, for example, if a prepayment scheme is implemented and an expiration date (associated therewith) has not occurred, a given number of copies of the file may be transferred between the storage and rendering devices.

Thus, as illustrated in FIG. 2 in simplified form, the digital file copy protection method and system of the present invention involves a "source" device 24 (or one or more of such devices), and a set of one or more "target" devices 26a–n connected via the secure channel or link 28. The physical characteristics of the channel, of course, depend on whether the source and target devices are located in the same machine or are in separate machines connected via a network. In a network connection, the link may be a conventional TCP/IP connection. Channel 28 may be a physically secure channel (such as a https connection), but this is not required as the given security protocol in the certified devices establishes a secure link. According to the invention, once the link is established, one or more digital files are transferred (under the control of a control routine or mechanism) between the certified devices in an predictable, auditable manner so that (a) a controlled number of file transfers can be made, and (b) the precise number of file transfers (and their particular use) may be readily documented to facilitate dissemination of royalties or some such other consideration, typically to providers of such content. Generalizing, prior to transfer of a given digital file (or set of files, or file component) from the source to the target via the secure link, that transfer must first be authorized, and the transfer itself is then capable of being associated with some royalty payment then due to a content provider for use of such file. The scheme thus facilitates implementation of a generalized copyright management/royalty collection and distribution scheme.

Figure 3:
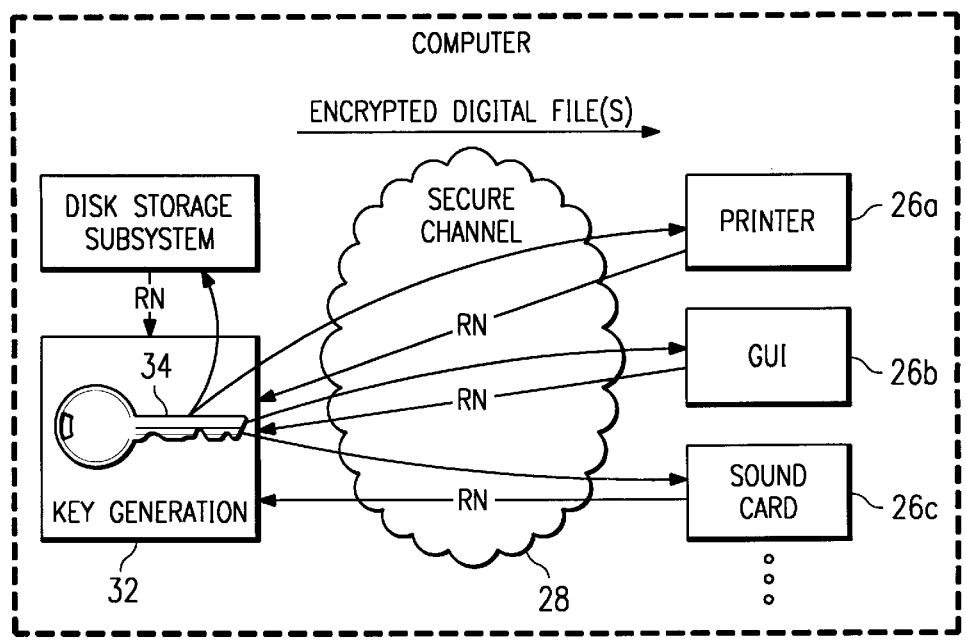
FIG. 3 is an illustrative example of a source device connected to a set of target rendering devices in a client computer.

As previously mentioned, the source 24 and target 26 may be located on the same computer. FIG. 3 illustrates this particular connection for a disk storage subsystem 24' and the target rendering devices, namely printer 26a', display 26b' and sound card 26c'. The illustrated computer is a Web appliance, in which case the secure link may be established (as noted above) using software. Thus, in this example, each source and/or target device includes appropriate control software (part of software 15 as described above) to facilitate creation of the secure channel. Although not meant to be limiting, one convenient mechanism to create the channel involves each of the devices to generate a random number 30, which numbers are then supplied to a key generation algorithm 32 in a known manner to generate a secret of "private" key 34. The key 34 may be generated for each digital file to be transferred over the link 28, or a signal key may be used for a set of such files, or even for a particular browsing session. To create the secure channel, the software resident on the disk storage encrypts the digital file as it leaves the source device. The target device then decrypts the digital file using the key prior to rendering. In this way, the digital file cannot be readily intercepted as it is being transferred between these devices. As noted above, each of the source and target devices may also include secure chips or other known hardware devices to facilitate or augment such secure transfer of the digital file between the devices.

The particular mechanism for securing the channel between the source and target may be quite varied, and the present invention contemplates the use of any now known or later-developed technique, system or method for securing such communications. Thus, for example, another technique that may be used would be a public key cryptosystem.

Figure 4:
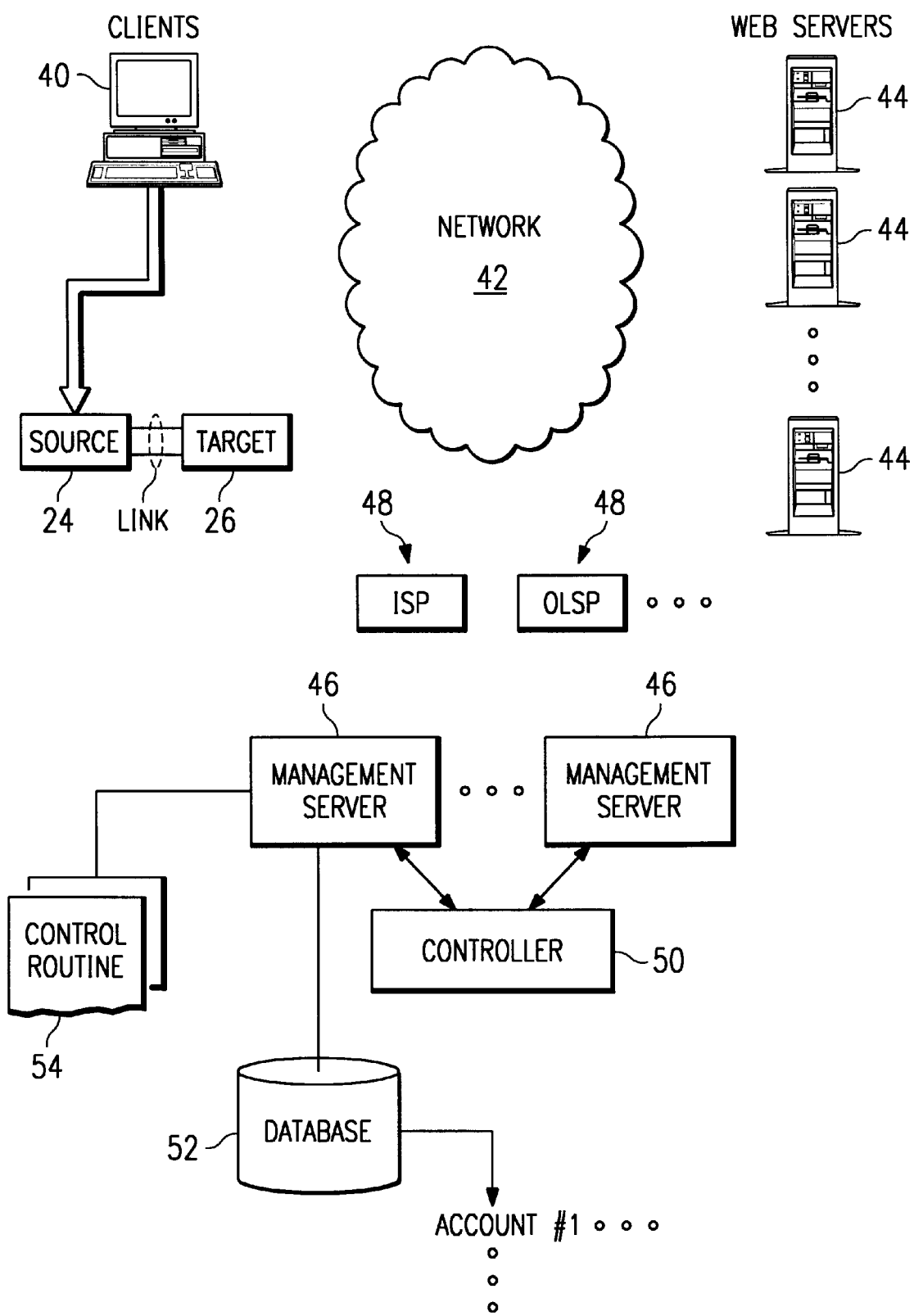
FIG. 4 is a block diagram of a representative copyright management system according to the present invention.

FIG. 4 is a block diagram illustrating a representative copyright royalty management system implemented according to the present invention. In this system, it is assumed that client computers 40 access the computer network 42 (e.g., the public Internet, an intranet, an extranet, or other computer network) to obtain access to Web-like documents supported on Web servers 44. One or more management servers 46 are connectable to the system via an access provider 48, and a control management server 50 may be used to facilitate scaling of the architecture if required. Control management server 50 may be controlled by a regulatory or rights agency that has responsibility for managing collection and distribution of copyright royalties.

A given management server includes a database 52 and appropriate control routines 54 for establishing a royalty account 55 for content providers. It is envisioned (although not required) that given content providers will subscribe to a royalty collection service implemented by the present invention and perhaps pay a fee (e.g., a commission or service charge) for the service provided. A given content provider thus may subscribe to the service to receive royalty payments for the use of his or her copyrighted content by users of the client machines. To this end, control routines 54 are used to establish an account for each of a set of given content providers, with each account including a representation of a given royalty value (which may be $0 when the account is established). A control routine then adjusts the given royalty value in a given provider account in response to receipt of an indication that a given digital file associated with the given content provider has been transferred from a source 24 to a target rendering device 26 in a given client computer 40. Periodically, the content provider account is adjusted for any service or processing fees, and the remainder of the account is then distributed to the content provider. In the situation where the content provider is willing to allow his or her content (a given digital file) to be used with charges for such use paid later, a given bit may be set in the file's copy control information indicating such preference. Other data in the copy control information may be used to set or control other content provider preferences with respect to use of the file within the context of the inventive scheme.

FIG. 5 is a flowchart of one method of managing royalty account collection with respect to a particular digital file when a prepayment option is utilized. In this representative example, the digital file is an image (i.e. a .jpeg file) having a copyright owned by a given content proprietor or provider. Of course, the principles of the present invention are designed to be implemented collectively with many such digital files, and the following description is thus merely representative of one type of basic payment scheme. The routine assumes initially that a usage or payment account has been established for a given client computer (or a user of that computer). This is step 60 in the flowchart. It is also assumed that a royalty account has been established for the content provider at one of the management servers as previously described. This is step 62 in the flowchart. One of ordinary skill will appreciate that steps 60 and 62 need not be in any particular sequence. Step 60 typically involves the user prepaying some amount of funds into an account from which payments may be withdrawn, although this is not required.

At step 64, a count is established by a control routine for the particular digital file. Typically, this is a count of a number of permitted copies of the digital file that may be transferred from the source to one or more target devices according to the present invention. This number, as noted above, is typically identified in the file's copy control information. The count is usually a positive integer, which is then decremented (by the control routine) down to zero as permitted or authorized copies are made. Alternatively, of course, the count may begin at zero (or any other arbitrary number), which is then incremented (by the control routine) to the threshold value identified in the copy count information. As noted above, the count may be set by the copyright proprietor, by a system operator, by a Webmaster, by hardware constraints, or by any other party or entity having authority and/or ability to set the count. Under certain circumstances, e.g., where a prepaid user account is used, it may be unnecessary to use an explicit count as the number of copies transferred may simply depend on the royalty assessed per copy. Thus, the "count" as used herein may be expressed explicitly or implicitly. The digital file may be stored on the client already, or it may be available from a Web server or other storage or archive. The particular location from which the digital file is sourced initially does not matter. Step 64 assumes, however, that the image is located already at the source device. If the file is not present at the source, it may be necessary to obtain it (although, conceptually, the "source" may be broadly construed as the original or initial location of the file).

At step 66, a test is done repeatedly to determine whether a request for the image has been received. If not, the routine cycles on step 66 and waits for such a request. If the outcome of the test at step 66 is positive, then the routine continues at step 68 by testing whether the given client computer (which generated the request) is authorized to effect the transfer. Step 68 may comprise a simple comparison of the user's account balance and the royalty amount to be assessed. If the user's account balance is large enough, the transfer may be allowed. Or, step 68 may simply test whether the count has a value indicating that further copies may be made. More typically, step 68 will require that the count be non-zero (in the situation where the count is positive and decremented to zero) and the user have sufficient funds allocated to pay the royalty assessment for use of the image. The step 68 may also test whether a given expiration date set in the copy count information has past.

If the outcome of the test at step 68 is negative, the transfer is not authorized, and the routine branches to step 70 to so notify the user of the client machine. Such notification may be in the form of an error or "access denied" message or the like. The user may be informed merely that a preset expiration date has passed or that his or her prepaid account is exhausted and requires more funds. If, however, the outcome of the test at step 68 is positive, the digital file may be transferred to the target. The routine then branches to step 72 to initiate the copy transfer. Preferably, all bytes of the file must be transferred before the transfer is considered valid. At step 74, the control routine count is adjusted (e.g., decremented) and/or a given charge is allocated against the user's account. The given charge may be equal to the royalty or use charge, or some fixed percentage thereof (e.g., 105%) reflecting that royalty plus some service charge). At step 76, the appropriate content provider account is adjusted by the amount of the royalty payment (plus or minus appropriate service fees or other charges).

Neither step 74 nor step 76 need occur at the time of the file transfer. Typically, the account adjustments will take place in batch at a given time. Thus, for example, where the Web client is a Web appliance connected to the computer network via a dialup connection, the account information may be transferred to the management server upon establishing a given connection (e.g. perhaps once each day). Other variations regarding the timing of delivery of this information are, of course, within the scope of the present invention.

The present invention thus provides numerous advantages. Certified source and target devices first establish a secure link between themselves. Upon transfer of the file copy between source and target, the control routine records an appropriate indication thereof in the copy count, and the central authority is notified of the transfer of the digital file. Such notification may occur upon transfer of the digital file between the source and target devices, or at some later time (e.g., upon dialup connection of the computer to the network). Royalty accounts are then managed at a central authority; to facilitate distribution of royalties to content owners/publishers. When the copy count reaches the authorized limit (as set in the copy control information), the control routine destroys the file or otherwise prevents further copying of the digital file.

Thus, in one embodiment, the user establishes a "prepaid" account from which royalty or usage payments are drawn against as files are copied/transmitted. The system detects use of the file and, preferably, allows only a certain number of copies of the file to be made before the document is destroyed or otherwise rendered inaccessible (from the client machine). The resulting copyright management infrastructure is robust, secure, scaleable and easily managed.

Figure 6B:
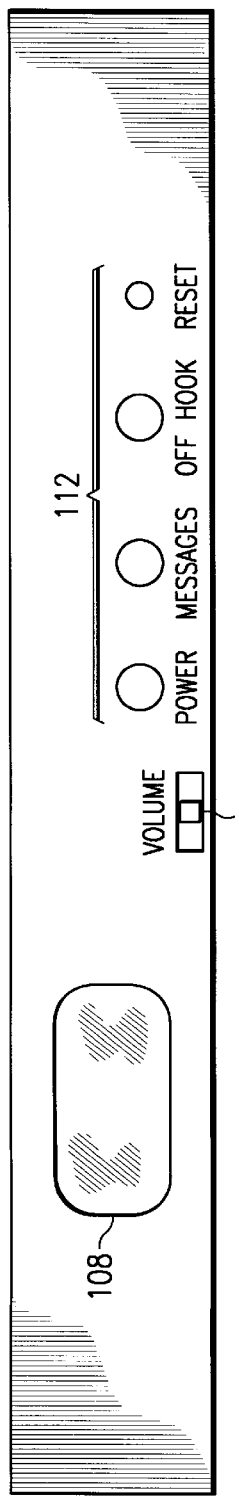
FIG. 6B is a pictorial representation of a front panel of the data processing system unit.

In one embodiment of this invention as described above, the Internet client is a data processing system or a so-called "Web appliance" such as illustrated in FIGS. 6A–6D and 7. FIG. 6A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

FIG. 6B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 6C:
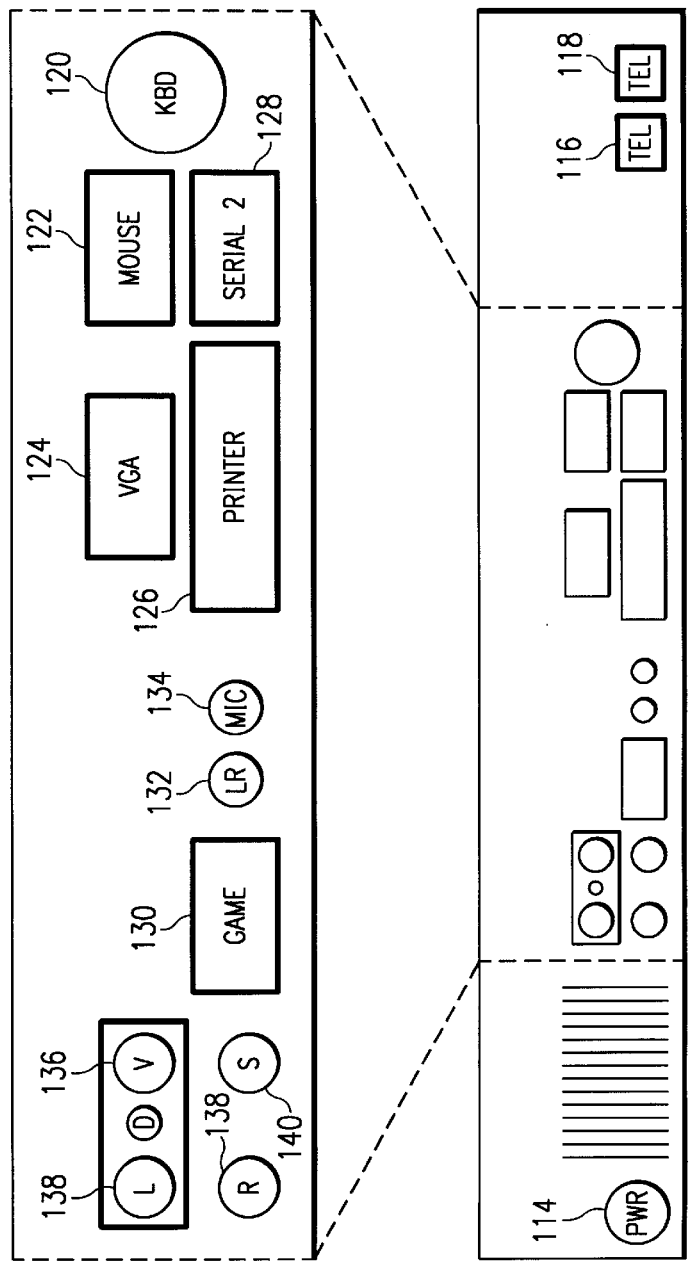
FIG. 6C is a pictorial representation of a rear panel of the data processing system unit.

FIG. 6C is a pictorial representation of the rear panel of data processing unit 102. A three wire (ground included)

insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figure 6D:
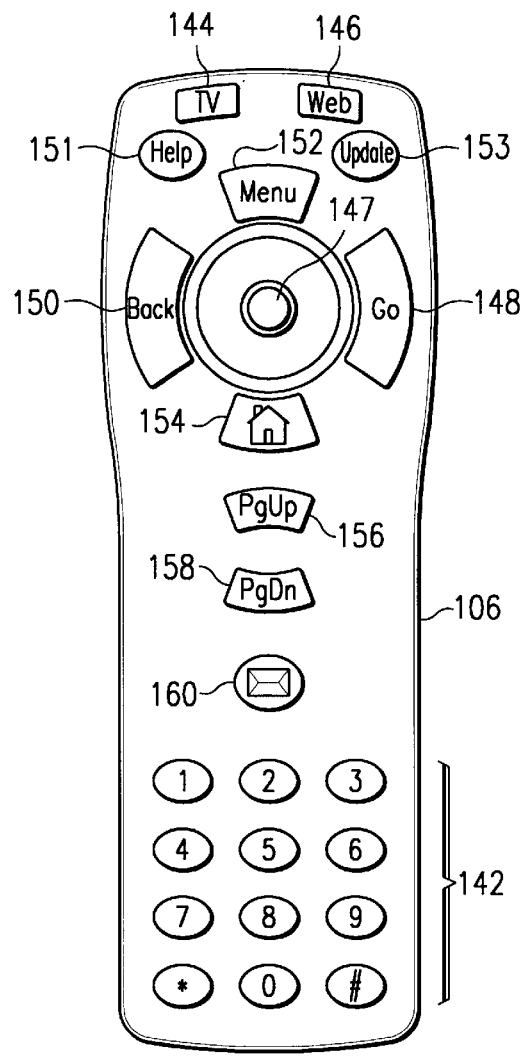
FIG. 6D is a pictorial representation of a remote control unit associated with the data processing system unit.

FIG. 6D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 7:
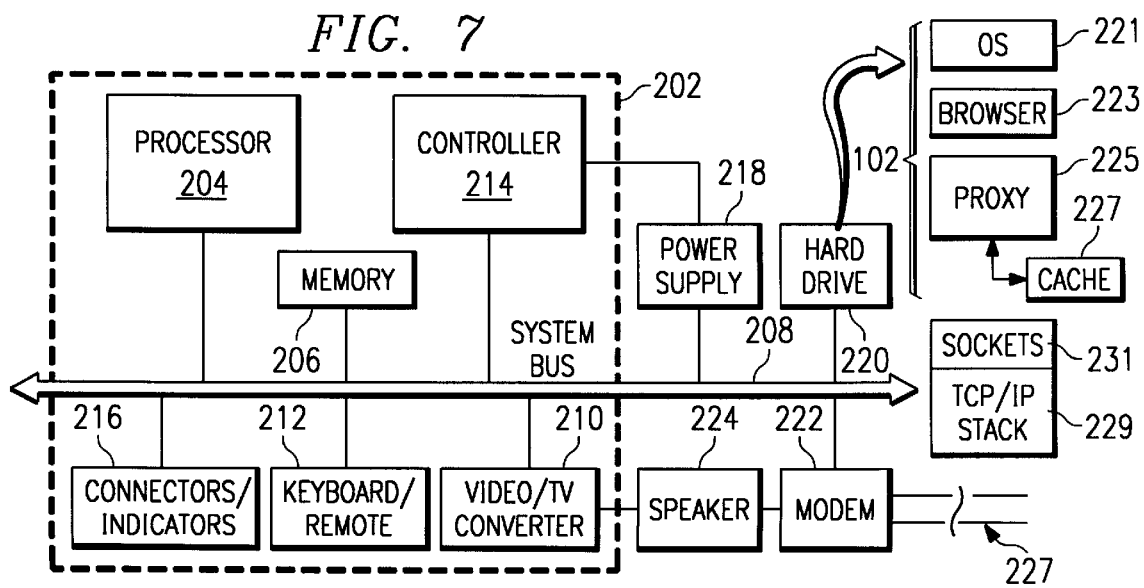
FIG. 7 is a block diagram of the major components of the data processing system unit.

Referring now to FIG. 7, a block diagram for the major components of data processing unit 102 is portrayed. As with conventional personal computers, data processing unit 102 includes a motherboard 202 containing a processor 204 and memory 206 connected to system bus 208. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. Power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. Hard drive 220 may also support an SMTP mechanism to provide electronic mail, an FTP mechanism to facilitate file transfers from Internet FTP sites, and other Internet protocol mechanisms, all in a known manner. Hard drive 220 is not generally accessible to the user of the Web appliance.

Modem 222 may be any suitable modem used in conventional data processing systems, but is preferably a 33.6 kbps modem supporting the V.42bis, V.34, V.17 Fax, MNP 1–5, and AT command sets. Modem 222 is connected to a physical communication link 227, which, in turn, in connected or connectable to the Internet (not shown).

Those skilled in the art will recognize that the components depicted in FIGS. 6A–6D and 7 and described above may be varied for specific applications or embodiments. Such variations in which the present invention may be implemented are considered to be within the spirit and scope of the present invention.

According to the invention, the client machine (typically the hard drive 220) also includes a proxy 225. Preferably, the proxy is implemented in software and includes a cache 227 associated therewith. The cache may be integral to the proxy or logically associated therewith. The cache preferably has a size up to several hundred megabytes, which is substantially larger than the standard cache associated with a browser such as Netscape Navigator. The client machine also includes a protocol stack 229 (e.g., a TCP/IP protocol stack) and a sockets mechanism 231, which are used to support communications in a known manner. According to the invention, the proxy 225 is advantageously located on the client along with the browser. Thus, the proxy is sometimes referred to as a "client side" proxy.

Preferably, the proxy starts up when the Web appliance is booted up. Connectivity between the proxy and the browser is achieved using the sockets mechanism by configuring the browser to pass the HTTP requests to the proxy. To send an HTTP GET request, the browser creates a packet (including the URL and other information) and then opens a socket using the sockets mechanism. The packet is then sent to the IP address/port number to service the HTTP request. Thus, when the browser issues an HTTP GET request, it binds to the socket and sends the request. The request is then intercepted and processed by the proxy instead of being sent directly over the network, all in the manner previously described.

Although in the preferred embodiment the client machine is a Web "appliance", this is not a requirement of the present invention. Thus, a client machine 10 may be a personal computer such as a desktop of notebook computer, e.g., an IBM® or IBM-compatible machine running under the OS/2® operating system, an IBM ThinkPad® machine, or some other Intel x86 or Pentium®-based computer running Windows '95 (or the like) operating system.

A representative server platform comprises an IBM RISC System/6000 computer (a reduced instruction set of so-called RISC-based workstation) running the AIX (Advanced Interactive Executive Version 4.1 and above) Operating System 21 and Server program(s) 22. The platform 20 also includes a graphical user interface (GUI) 23 for management and administration. It may also include an application programming interface (API) 24. HTTP GET requests are transferred from the client machine to the server platform, typically via the dial-up computer network, to obtain documents or objects formatted according to HTML or some other markup language. While the above platform is useful, any other suitable hardware/operating system/server software may be used.

One of the preferred implementations of the client side or server side mechanisms of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web clients" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

In addition, the term "Web appliance" should be broadly construed to cover the display system illustrated in FIGS. 6A–6D, as well as any other machine in which a browser application is associated with some television class or other display monitor. Moreover, while the preferred embodiment is illustrated in the context of a dial-up network, this is not a limitation of the present invention. There may be other "bottleneck" resources in a direct connect network that could be managed indirectly by using this approach.

Having thus described our invention, what we claim as new and desire to secure by letters patent is set forth in the following claims:

What is claimed is:

1. A method for managing use of a digital file, comprising the steps of:

establishing a secure link between a pair of devices, each of the devices being certified to operate under a given security protocol;

establishing a usage scheme defining one or more conditions under which the digital file may be transferred between the pair of devices; and transferring one or more copies of the digital file over the secure link between the pair of devices in accordance with the established usage scheme;

wherein the digital file includes content subject to copyright protection.

2. The method as described in claim 1 wherein the pair of devices include a storage device and a rendering device.

3. The method as described in claim 2 wherein the storage device and the rendering device are located in a computer.

4. The method as described in claim 2 wherein the storage device is located in a first computer and the rendering device is located in a second computer and the secure link is established over a computer network connecting the first and second computers.

5. The method as described in claim 4 wherein the second computer is a personal computer and the rendering device includes circuitry for establishing the secure link.

6. The method as described in claim 4 wherein the second computer is a Web appliance and the rendering device includes software for establishing the secure link.

7. The method as described in claim 2 wherein the rendering device is selected from a group of rendering devices consisting essentially of a printer, a display, and a sound card.

8. The method as described in claim 1 further including the step of establishing an account representing a given monetary value.

9. The method as described in claim 8 further including the step of allocating a given charge against the given monetary value when a copy of the digital file is transferred between the pair of devices.

10. The method as described in claim 9 further including the step of associating the given charge with a content provider account to facilitate the payment of the given consideration to the provider of the digital file.

11. The method as described in claim 1 wherein the usage scheme includes a given payment method.

12. A method for managing use of digital material in a computer network, comprising the steps of:

establishing an account for a given client computer including a representation of a given monetary value;

establishing an account for a given content provider including a representation of a given royalty value; and establishing a count of a number of permitted copies of a digital file;

in response to a given protocol, transferring a copy of the digital file from a source to a target associated with the given client computer;

adjusting the given monetary value in the account of the given client computer; and adjusting the given royalty value in the account of the given content provider;

wherein the digital file includes content subject to copyright protection.

13. The method as described in claim 12 wherein the given protocol includes the steps of:

determining whether a given client computer requesting transfer of the digital file is authorized to effect the transfer;

if the client is authorized to receive the transfer of the digital file, determining whether the count has a given value; and if the count has the given value, transferring the digital file from the source to the target.

14. The method as described in claim 13 wherein the given value is a non-zero value.

15. The method as described in claim 13 wherein the given protocol further includes the step of adjusting the count after a copy of the digital file has been transferred.

16. The method as described in claim 15 wherein the count is decremented.

17. The method as described in claim 12 wherein the source and target are located in the given client computer connected to the computer network.

18. The method as described in claim 17 wherein the source is a disk storage device and the target is a device selected from a group of rendering devices consisting essentially of a printer, a display, and a sound card.

19. The method as described in claim 12 wherein the source is located on a first computer and the target is located on a second computer connected to the first computer via the computer network.

20. A method for managing use of digital material in a computer network including a Web client connectable to a Web server, comprising the steps of:

establishing a count of a number of permitted copies of a digital file located at a source device in the Web client;

in response to a given protocol, transferring one or more copies of the digital file from the source device to a set of one or more target rendering devices in the Web client; and for each such transfer from the source device to one of the target rendering devices, logging an indication that the digital file has been transferred to facilitate payment of a given consideration to a provider of the digital file;

wherein the digital file includes content subject to copyright protection.

21. The method as described in claim 20 wherein the Web client is a Web appliance and the source device is a secure disk storage.

22. The method as described in claim 21 wherein each target rendering device is a device selected from a group of target rendering devices consisting essentially of a printer, a display, and a sound card.

23. The method as described in claim 20 wherein the Web client is connected to the Web server via a non-secure connection.

24. The method as described in claim 23 wherein the given protocol further includes the step of establishing a secure channel between the source device and a target rendering device prior to transferring the digital file.

25. The method as described in claim 24 wherein the step of establishing a secure channel includes generating a secret key shared by the source device and the target rendering device.

26. The method as described in claim 25 wherein the source device encrypts the digital file with the secret key as the source device transfers the digital file to the target rendering device, and wherein the target rendering device decrypts the digital file with the secret key upon receipt.

27. A computer program product in computer-readable media for use in a Web client having a source device and one or more target rendering devices, the computer program product comprising:

means for establishing a count of a number of permitted copies of a digital file located at the source device;

means, responsive to a given protocol, for transferring one or more copies of the digital file from the source device to the one or more target rendering devices;

means, responsive to each transfer, for logging an indication that the digital file has been transferred to facilitate payment of a given consideration to a provider of the digital file; and means responsive to the logging means for adjusting the count;

wherein the digital file includes content subject to copyright protection.

28. The computer program product as described in claim 27 further including means for restricting transfer of the digital file when the count reaches a given value.

29. The computer program product as described in claim 27 wherein the Web client is a Web appliance and the source device is a secure disk storage.

30. The computer program product method as described in claim 29 wherein each target rendering device is a device selected from a group of target rendering devices consisting essentially of a printer, a display, and a sound card.

31. The computer program product as described in claim 27 wherein the Web client is connected to the Web server via a non-secure connection.

32. The computer program product as described in claim 31 further including means for establishing a secure channel between the source device and a target rendering device prior to transferring the digital file.

33. The computer program product as described in claim 32 wherein the means for establishing a secure channel includes means for generating a secret key to be shared by the source device and the target rendering device.

34. The computer program product as described in claim 27 further including means responsive to a given occurrence for transferring the indication to a central authority.

35. The computer program product as described in claim 34 wherein the given occurrence is establishing a dialup connection between the Web client and an Internet Service Provider.

36. A computer system connected to a computer network and including a source device and one or more target rendering devices, comprising:

a processor;

an operating system;

an application for managing use of digital material, comprising:

means for establishing a count of a number of permitted copies of a digital file located at the source device;

means, responsive to a given protocol, for transferring one or more copies of the digital file from the source device to the one or more target rendering devices;

means, responsive to each transfer, for logging an indication that the digital file has been transferred to facilitate payment of a given consideration to a provider of the digital file; and means responsive to the logging means for adjusting the count;

wherein the digital file includes content subject to copyright protection.

37. The computer system as described in claim 36 wherein the application further includes means for restricting transfer of the digital file when the count reaches a given value.

38. The computer system as described in claim 36 wherein the computer is a Web appliance and the source device is a secure disk storage.

39. The computer system as described in claim 38 wherein each target rendering device is a device selected from a group of target rendering devices consisting essentially of a printer, a display, and a sound card.

40. The computer system as described in claim 36 wherein the application further includes means for establishing a secure channel between the source device and a target rendering device prior to transferring the digital file.

41. The computer system as described in claim 36 wherein the application further includes means responsive to a given occurrence for transferring the indication to a central authority.

42. A data processing system, comprising:

a remote control unit; and a base unit connectable to a monitor for providing Internet access under the control of the remote control unit, the base unit comprising:

a processor having an operating system;

a browser application run by the operating system;

a secure disk storage in which a digital file is stored;

one or more target rendering devices; and means for restricting a number of copies of the digital file that may be transferred between the secure disk storage and the one or more target rendering devices;

wherein the digital file includes content subject to copyright protection.

43. The data processing system as described in claim 42 wherein the restricting means includes means responsive to a given occurrence for transmitting an indication of a number of copies of the digital file that were transferred between the secure disk storage and the one or more target rendering devices during a given time interval.

44. The data processing system as described in claim 43 wherein the given occurrence is a dialup connection of the data processing system to an Internet Service Provider.

45. A management server for use in managing collection and allocation of royalties among content providers, the management server connected in a computer network to an access provider servicing a plurality of Web client appliances receiving dialup access to Web content, the management server comprising:

means for establishing an account for each of set of given content providers, each account including a representation of a given royalty value; and means for adjusting the given royalty value in the account of the given content provider in response to receipt of an indication that a given digital file associated with the given content provider has been transferred from a source to a target rendering device in a given Web client appliance;

wherein the digital file includes content subject to copyright protection.

46. A copy management system, comprising:

a first device and a second device, each of which is certified to operate under a given security protocol;

means for establishing a secure link between the first and second devices; and means responsive to establishment of the secure link for managing transfer of a permitted number of copies of a digital file between the first and second devices in accordance with copy control information restrictions associated with the digital file;

wherein the digital file includes content subject to copyright protection.

* * * * *